Oct. 12, 1965       W. R. YOUNGS       3,211,211
AIRCRAFT HANGAR AND DOOR
Filed Sept. 9, 1963                4 Sheets-Sheet 1

INVENTOR.
WILBUR R. YOUNGS
BY
Schramm, Kramer & Sturges
ATTORNEYS.

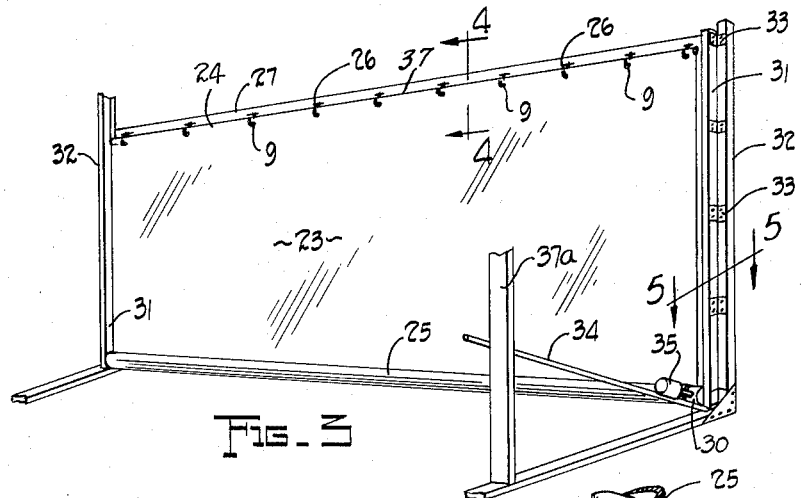
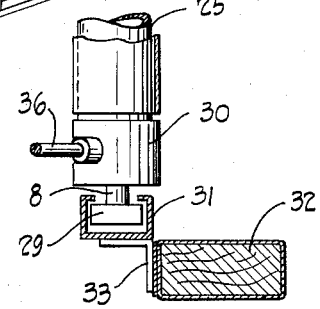
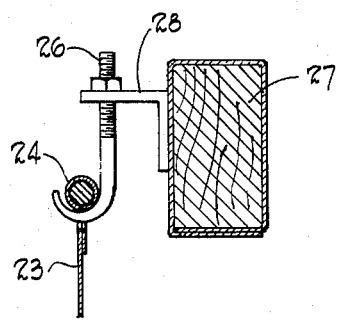
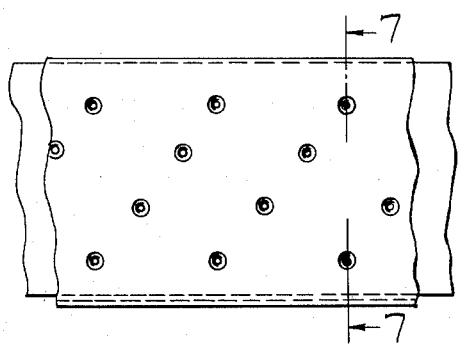
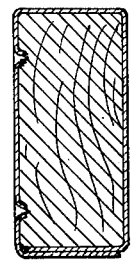
INVENTOR.
WILBUR R. YOUNGS

Oct. 12, 1965 W. R. YOUNGS 3,211,211
AIRCRAFT HANGAR AND DOOR
Filed Sept. 9, 1963 4 Sheets-Sheet 3

INVENTOR.
WILBUR R. YOUNGS
BY
Schramm, Kramer & Sturgis
ATTORNEYS.

Oct. 12, 1965  W. R. YOUNGS  3,211,211
AIRCRAFT HANGAR AND DOOR
Filed Sept. 9, 1963  4 Sheets-Sheet 4
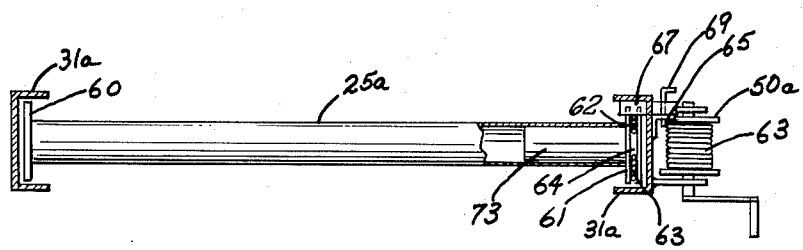
FIG_11
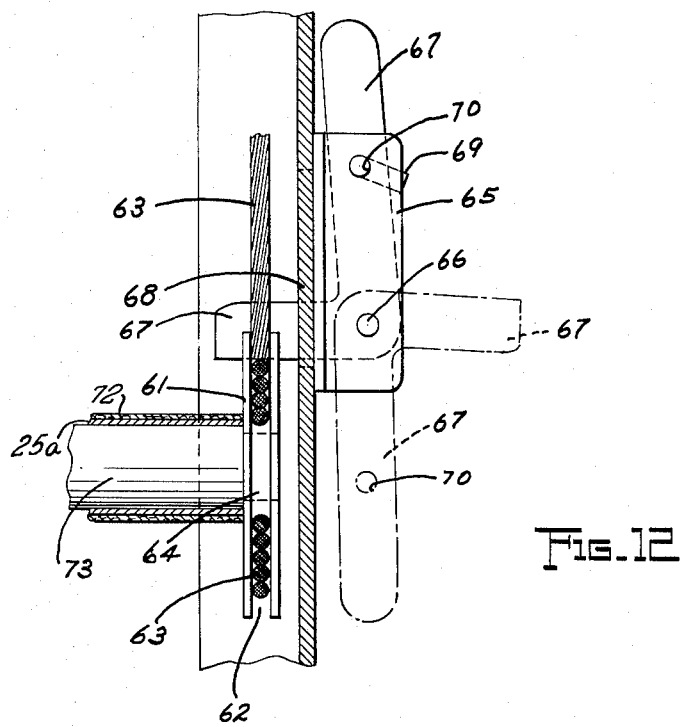
FIG_12
INVENTOR.
WILBUR R. YOUNGS
BY
Schramm, Kramer & Sturges
ATTORNEYS.

United States Patent Office 3,211,211
Patented Oct. 12, 1965

3,211,211
AIRCRAFT HANGAR AND DOOR
Wilbur R. Youngs, 2700 Northbourne Drive,
Springfield, Ohio
Filed Sept. 9, 1963, Ser. No. 307,482
4 Claims. (Cl. 160—243)

This invention relates to aircraft enclosures, more particularly to lightweight, portable, enclosures.

More and more Americans are owning and operating their own aircraft, and a need has arisen for lightweight, inexpensive enclosures to house these aircraft. Present day enclosures are made of steel and concrete, permanent in nature, and costly; too much so, for housing light aircraft. Our ever shifing population dictates that these enclosures should, desirably, be portable. This invention is intended to meet these requirements, as it is designed to be composed of lightweight members, and lightweight covering, inexpensive to construct, and can easily be moved from one location to another.

This invention may be better understood by having reference to the annexed drawings, showing a preferred illustrative embodiment of the present invention, which is to be understood as illustrative, and not limiting of the broad scope hereof.

FIG. 3 is a perspective view of the novel aircraft enclosure door.

FIG. 4 is a cross-sectional view taken in the plane indicated by 4—4 in FIG. 3, showing the head jamb, and the adjustable fasteners, which hold the enclosure door.

FIG. 5 is a cross-sectional view taken in the plane indicated by 5—5 in FIG. 3, showing the side jamb with affixed U-shaped channel door guide, and the bottom roller of the enclosure door.

FIG. 6 is a side view of the preferred type of lightweight member, which can be used in the enclosure framework. This member is wood encased in thin gauge metal.

FIG. 7 is a cross-sectional view taken in the plane indicated by 7—7 in FIG. 6, showing the metal punched to the wood.

FIG. 11 is a top view of a preferred embodiment of the aircraft enclosure door, with the channels shown in section.

FIG. 12 is a fragmentary cross-sectional view showing a locking and tensioning means useful in accordance herewith.

Briefly stated, this invention is in the provision of a flexible closure for an opening, particularly an opening having a long horizontal span such as an aircraft hangar which opening is characterized by a head member and side jamb means. A flexible curtain dimensioned to cover the opening and having parallel top and bottom edges is secured to the head member. A roller is provided attached to the bottom marginal edge of the curtain, the weight of the roller being supported solely by the curtain as it moves toward and away from the head member. Guide means are provided coacting between each extremity of the roller and the adjacent parallel side members to limit lateral displacement of the roller in a direction normal to the plane of the curtain. This principle is important in aircraft hangars which must withstand wind loads of the magnitude of 20 lbs. per square foot. Driving means mechanically coupled to and coacting directly with the roller at at least one extremity are provided for directly applying a rotational force to the roller to move it along the curtain.

Figure 1:
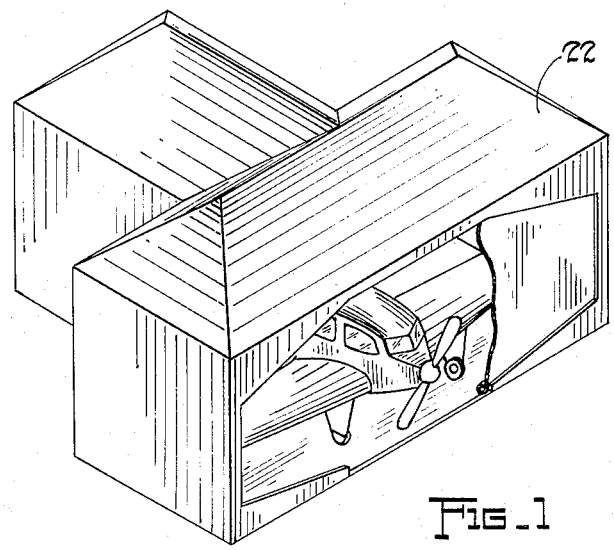
FIG. 1 is a perspective view of the completed aircraft enclosure.
Figure 2:
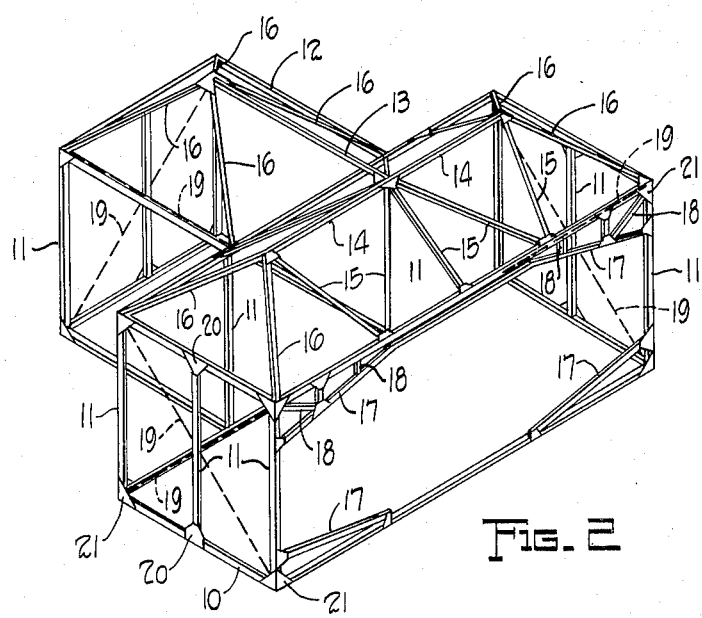
FIG. 2 is a perspective view of the completed framework of the enclosures.

Referring more particularly to FIGS. 1 and 2, the enclosure is made up of lightweight members of wood, metal, plastic, plasticized material, but preferably, thin-gauge metal encased wood members, with the metal punched into the wood as shown in FIGS. 6 and 7. This type of member has proved easier to make, handle, and install, and has further proved that it is sufficiently strong to withstand the stresses placed upon it. The frame can be any shape, square, rectangular, circular, triangular, but preferably, in the shape of an aircraft, e.g. T-shaped. This particular shape given minimum clear spans, lending itself readily to lighter trussed members. The roof can be trussed to form a shed, pitched, or hip roof. If the preferably T-shaped frame is used, however, it is best to truss the roof to form a hipped type roof, as this type braces the structure, and adds rigidity. In addition to this, the complete framework is easier to cover. Any type water repellant material can be used as a covering for the enclosure. If more permanency is desired, lightweight metallic material can be used as a covering.

Thus, as shown in FIGS. 1 and 2, there is provided a frame including a base plate 10 in the outline of an aircraft, and a plurality of vertical stud members 11. It will be observed in a structure suitable for small aircraft, the spacing of the studs 11 is considerably wider than conventional practice requires, because of the greatly increased strength of the preferred metal wrapped structural members, and the flexibility of the outer covering. Supported by the studs 11, is a top plate 12, conforming in outline to the base plate 10. Perpendicularly intersecting ridges 13 and 14 are supported by intermediate rafters 15, and hip rafters 16 extending from the corners of the top plate 12, to the ridges 13 and 14, respectively. The front of the structure has a door opening formed by corner braces 17 in a trussed fashion with as many struts 18 as may be required to give the door opening strength and rigidity. To improve the stability of the structure against wind, lateral cross ties 19 may be provided. The structural members are preferably joined by either wood or metal gusset plates, e.g. plates 20 and 21, which are bolted or nailed to the metal-clad wooden beams.

To anchor the framework to the ground, ground anchors of conventional design may be used, and located at the corners, and, if necessary, at intermediate points on the base plate 10.

To complete the hanger body, a weatherproofed, flexible covering 22, which is preferably prefabricated as a single unit, is stretched over the framework as shown in FIG. 1.

A particularly improved hanger, in accordance herewith, is provided with a novel flexible closure device shown in FIGS. 3, 4, 5, 8, 9, 10, 11 and 12. In FIG. 3, there is shown a door 37 of water repellant fabric material 23, which is fastened between a small bar 24 at the top, and a larger tubular roller 25 at the bottom. Just below the top bar 24, are located eyelets 9, disposed and secured along the upper marginal edge of flexible door 37 which eyelets 9 are adapted to coact with adjustable J-screws 26 (FIG. 4) to support the curtain smoothly. J-screws 26 are spaced along the head jamb 27, and fastened to said head jamb 27, by metal angles 28 (FIG. 4). FIG. 5 shows in enlarged detail a cross section of the side jamb 32, to which is secured guide channel 31. In the embodiment shown, the roller 25 is provided with a gear box 30 directly secured to the roller 25 for driving the roller 25. Shaft 8 extending from gear box 30 carries a roller 29 which facilitates movement of the assembly within the channel 31 as the roller moves toward and away from the head member 27 (FIG. 3). A guide roller such as guide roller 29 is also conveniently provided at the opposite extremity of the roller 25 for coaction with a similar guide channel 31 adjacent the opposite side jamb 32. The gear box 30 is provided with a torque arm 34 (FIG. 3), upon which is mounted the motor 35 (FIG. 3). The rotating shaft 36 of motor 35 is perpendicularly disposed to the gear box 30 and the lower tubular roller 25. Rotating motion of the shaft 36 is transformed by means of gears in the gear box 30, to cause rotation of the roller 25 which, when it rotates, winds itself upwards on the door material 23. The door 37 may be stopped at any height by shutting off the power. This door 37 may be secured in any desired position by any suitable means. Torque arm 34 merely serves the obvious purpose of preventing the motor 35 from itself rotating about the end of the roller 25 and may be supported on vertical stud member 37a.

Figure 8:
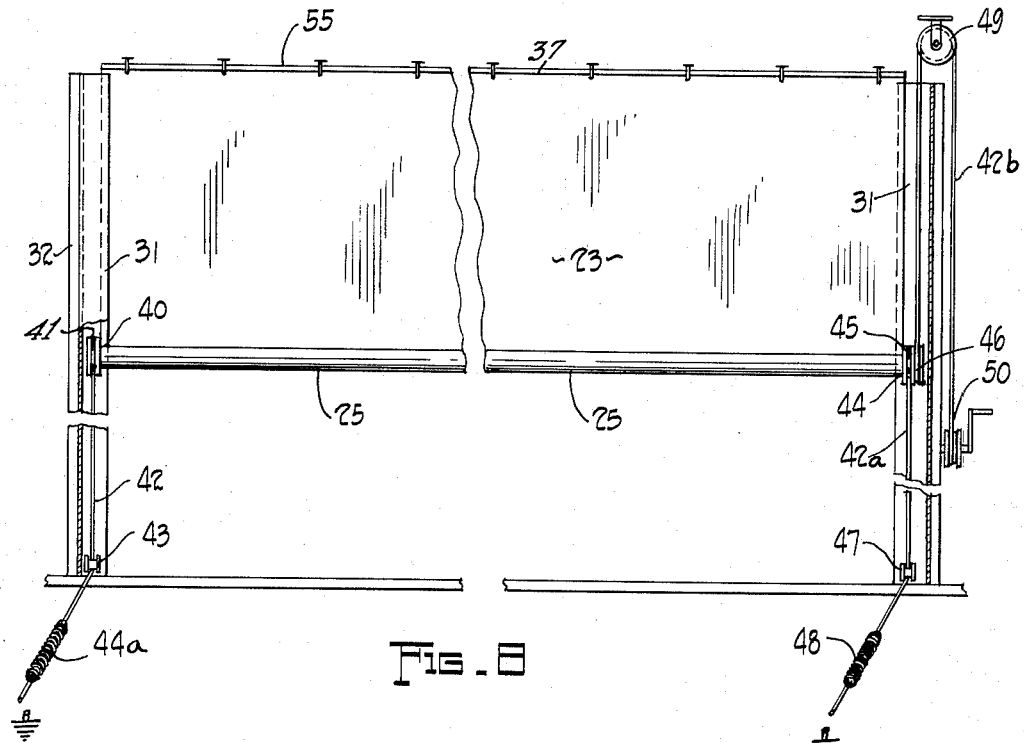
FIG. 8 is a rear view of one embodiment of the aircraft enclosure door.
Figure 9:
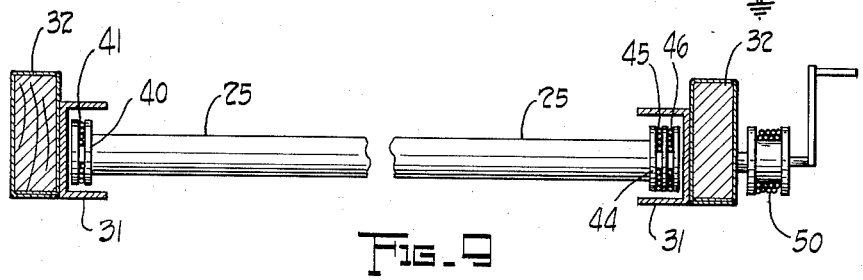
FIG. 9 is a partial top sectional view of the bottom roller end grooved sheaves in the side channel guides.
Figure 10:
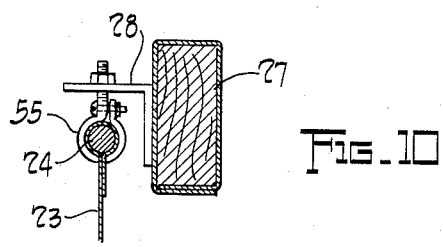
FIG. 10 is a sectional view of a preferred type of securing device used to fasten the top marginal edge of the door to the head jamb.

One embodiment of this enclosure door 37 is shown in FIGS. 8, 9 and 10.

Located at the extremities of the bottom roller 25 are sheaves 40 and 44. Sheave 40 has a circumferential groove 41, wherein rope 42 is wound and secured to the ground through pulley 43 and spring 44a. Preferably, the width of the sheave slot is just enough to accommodate rope 42. The spring 44a supplies tension to the line 42 keeping the door material 23 smooth. The rope 42, on the sheave 40, winds as the roller 25 is rolled downwardly. Sheave 44, located at the other end of the roller 25 has two circumferential grooves 45 and 46. Rope 42a is wound in slot 45 of sheave 44 and secured to the ground through pulley 47 and spring 48 in the same manner as sheave 40. Similar rope 42b is wound in the other groove 46 of sheave 44 in the same direction to that of the rope 42a in slot 45. Rope 42b is drawn upwards from sheave 44 and reeved around elevating pulley 49 then downwards and fastened to a winch 50, which may be secured to the side jamb 32. The free ends of ropes 42a and 42b are anchored within the grooves 45 and 46, respectively, or rope 42a and 42b may be a single rope wrapped around a single groove sheave in which the groove is wider than the rope or cable diameter by a factor of at least 2, one or more turns to yield the same result, one end being secured to spring 48 and the other to winch drum 50.

A more preferred type of securing the top marginal edge 24 of the door 37 is shown in FIG. 10. Eyelets 9 in the door material 23 are not needed, as the adjustable screw 55 is firmly clamped to the upper bar 24. Adjustable screw 55 is fastened to the head jamb 27 by metal angles 28 such as used in combination with the adjustable J-screws 26.

Referring more particularly to FIGS. 11 and 12. The bottom roller 25a rolls upwards and downwards in a path determined by side channels 31a. Fastened at the respective extremities of roller 25a is a guide disc 60 and a sheave 61. Sheave 61 has a circumferential groove 62, adapted to accept rope 63 preferably in spiral form. Rope 63 is fastened, at one end to the core 64 of the sheave 61. The other end is drawn upwards from sheave 61 and reeved around elevating pulley 49 (FIG. 8), then downwards and fastened to a winch 50a.

Located along channel 31a at desired locking heights, there may desirably be provided brackets 65 for mounting a sheave roller locking means. Bracket 65 is provided with pivot pin 66, around which a generally L-shaped locking and tensioning lever 67 pivots. Slot 68 in the side channel 31a permits the lever 67 to be pivoted upwards into locked position. The locking of lever 67 is accomplished by placing pin 69 through similarly aligned holes 70 in bracket 65 and lever 67.

In its locked position lever 67 extends into and diminishes the width of channel 31a to be insufficient for free passage of the sheave 61 therealong and thus prohibits any further upward linear movement of roller 25a. Lever bar 67 holds sheave 61 in fixed relation to side channel 31a. Further winding of winch 63 rotates roller 25a in its fixed position. This rotating motion tightens the fabric 72 on roller 25a, giving the door greater wind resistance. To keep roller 25a evenly aligned as it rolls upwards and downwards, a cylindrical weight 73 is fastened inside roller 25a on the sheave side of said roller 25a. Instead of weight 73, any other means for applying a force downwardly on the roller 25a may be used, for example the spring loading means 48 in FIG. 8. Weight 73 is most effective and simple and is of a magnitude to maintain the roller ends in approximately the same plane for even rolling of the roller along the curtain.

Although the flexible material doors of the invention have been found most satisfactory under adverse wind conditions, in larger installations for commercial size aircraft, it may be found advantageous to supply ground anchors adapted to be releasably hooked over the bottom roller when it is in the closed position. Also stiffening members or stays may be provided to improve the wind resistance of the door. However, as above indicated, for small aircraft hangers having correspondingly smaller doors or curtains, this has not been found necessary. Thus, door spans of 40 to 50 feet, and heights of about 15–18 feet apparently require no additional curtain backing supports.

The hanger covering material 22 and the curtain material 23 for the door may be any of the currently available rubberized fabrics, e.g. neoprene impregnated nylon. Such materials exhibit remarkable strength, weather resistance and durability, all of which are important characteristics for coverings for hangers.

This lightweight aircraft enclosure as described is readily adaptable to any location, inexpensive to construct, and easily maintained. This structure, combined with the novel enclosure door, can satisfy a great need in this country for just such an aircraft enclosure. The door structures are also readily adaptable for gymnasium dividers, conference room dividers, etc.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A flexible closure for an opening defined by a head member, a pair of spaced parallel side members or jambs, and a base comprising in combination:
   (a) a flexible curtain dimensioned to cover the opening, and having parallel top and bottom marginal edges;
   (b) means coacting between the top marginal edge of said curtain and said head member to secure said curtain to said head member;
   (c) a roller secured to the bottom marginal edge of said curtain and supported solely by said curtain as it moves toward and away from said head member;
   (d) guide means coacting between each extremity of said roller and the adjacent parallel side members to limit lateral displacement of said roller in a direction normal to the plane of the curtain; and
   (e) driving means mechanically coupled to and coacting directly with said roller at at least one extremity for directly applying a rotational force thereto to drive said roller along said curtain.

2. A flexible closure in accordance with claim 1 wherein the driving means includes an electric motor.

3. A flexible closure in accordance with claim 1 in which the driving means includes:
   (1) a sheave secured to at least one end of said roller;
   (2) cable means secured directly to said sheave and coacting with said roller to effect rotation of said roller; and
   (3) drum means for taking up and paying out said cable means.

4. A flexible closure in accordance with claim 3 including load imposing means coacting at the sheave extremity of said roller to apply a force on the roller opposite in direction to the force on the cable means to maintain said roller substantially parallel to the head member at any position along the curtain.

References Cited by the Examiner

UNITED STATES PATENTS

| | | | |
|---|---|---|---|
| 77,499 | 5/68 | Legg | 160—243 X |
| 379,614 | 3/88 | Smith | 160—319 X |
| 626,475 | 6/89 | Andrews | 160—243 |
| 954,179 | 4/10 | Gastram | 160—243 X |
| 1,786,084 | 12/30 | Phinn | 160—320 |
| 2,520,055 | 8/50 | Pomerance | 189—1.5 X |
| 2,532,456 | 12/50 | Merritt | 189—1.5 X |
| 2,711,180 | 6/55 | Simms et al. | 135—3 |
| 3,092,170 | 6/63 | Ellis | 160—133 X |

REINALDO P. MACHADO, *Primary Examiner.*

HARRISON R. MOSELEY, *Examiner.*